(12) United States Patent
Peckels

(10) Patent No.: US 9,254,944 B1
(45) Date of Patent: Feb. 9, 2016

(54) ASSEMBLY AND METHOD FOR POURING LIQUID FROM A CONTAINER

(71) Applicant: Arganius E. Peckels, Ogilvie, MN (US)

(72) Inventor: Arganius E. Peckels, Ogilvie, MN (US)

( * ) Notice: Subject to any disclaimer, the term of this patent is extended or adjusted under 35 U.S.C. 154(b) by 0 days.

(21) Appl. No.: 14/680,156

(22) Filed: Apr. 7, 2015

(51) Int. Cl.
*B65D 47/06* (2006.01)

(52) U.S. Cl.
CPC .................. *B65D 47/06* (2013.01)

(58) Field of Classification Search
CPC .......................................... B65D 47/06
USPC ................. 222/477, 481, 481.5, 476, 567
See application file for complete search history.

(56) References Cited

U.S. PATENT DOCUMENTS

| | | | | |
|---|---|---|---|---|
| 2,727,644 A * | 12/1955 | Giannos | ................ | B65D 47/06 222/400.7 |
| 2,819,824 A * | 1/1958 | Ebert | ................ | B65D 47/06 222/192 |
| 2,951,619 A * | 9/1960 | Strumor | ................ | B65D 47/06 222/192 |
| 3,233,797 A * | 2/1966 | Conry | ................ | G01F 11/265 222/477 |
| 3,321,113 A * | 5/1967 | Conry | ................ | G01F 11/265 222/477 |
| 5,746,358 A * | 5/1998 | Crosby | ................ | B65D 47/06 222/479 |
| 5,961,008 A * | 10/1999 | Peckels | ................ | B65D 39/06 222/477 |
| 6,123,225 A * | 9/2000 | Peckels | ................ | B65D 39/06 222/1 |
| 6,523,720 B1 * | 2/2003 | Robbins, III | ........ | B29C 49/0073 222/481.5 |
| 2008/0272147 A1 * | 11/2008 | Buker | ................ | B65D 47/06 222/113 |
| 2011/0036873 A1 * | 2/2011 | Peckels | ................ | B67D 3/0045 222/476 |
| 2012/0074172 A1 * | 3/2012 | Federighi | ................ | B01F 3/0446 222/190 |
| 2012/0181307 A1 * | 7/2012 | Grosser | ................ | B65D 47/06 222/478 |

FOREIGN PATENT DOCUMENTS

CA         2154371 A1 *  1/1997  ............. B65D 47/06

* cited by examiner

*Primary Examiner* — Donnell Long
(74) *Attorney, Agent, or Firm* — Dave Alan Lingbeck

(57) ABSTRACT

An assembly and method for pouring liquid from a container for ensuring that upon emptying the contents nothing will be left in the container. The assembly and method for pouring liquid from a container includes a pourer adapter including a tube portion having an open top, a bottom and a bore disposed therein through the open top and the bottom, and also configured to fasten to a container to facilitate emptying of liquid from the container; and a pourer member removably engaged to the pourer adapter for pouring the liquid from the container.

9 Claims, 5 Drawing Sheets

ASSEMBLY AND METHOD FOR POURING LIQUID FROM A CONTAINER

BACKGROUND OF THE INVENTION

1. Field of the Invention

The present invention relates to liquid pourers and more particularly pertains to a new assembly and method for pouring liquid from a container for ensuring that upon emptying the contents nothing will be left in the container.

2. Description of the Prior Art

The use of liquid pourers is known in the prior art. More specifically, liquid pourers heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a pour spout having a lid of a wide-mouthed container adapted to provide a channel through the lid to pour a liquid from the inside of the container to the outside. A pour spout made from a lid of a wide-mouthed container affixed to a spout from a narrow-necked bottle. Another prior art includes a pouring spout for fruit or containers and includes a threaded cap and a spout connected to the cap and extending outwardly from the cap. While these devices fulfill their respective, particular objectives and requirements, the aforementioned patents do not disclose a new assembly and method for pouring liquid from a container.

SUMMARY OF THE INVENTION

The general purpose of the present invention, which will be described subsequently in greater detail, is to provide a new assembly and method for pouring liquid from a container which has many of the advantages of the liquid pourers mentioned heretofore and many novel features that result in a new assembly and method for pouring liquid from a container which is not anticipated, rendered obvious, suggested, or even implied by any of the prior art liquid pourers, either alone or in any combination thereof. The present invention includes a pourer adapter including a tube portion having an open top, a bottom and a bore disposed therein through the open top and the bottom, and also configured to fasten to a container to facilitate empting of liquid from the container; and a pourer member removably engaged to the pourer adapter for pouring the liquid from the container. None of the prior art includes the combination of the elements of the present invention.

There has thus been outlined, rather broadly, the more important features of the assembly and method for pouring liquid from a container in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments arid of being practiced and carried out in various ways. Also, it is to be understood that the phraseology and terminology employed herein are for the purpose of description and should not be regarded as limiting.

It is an object of the present invention to provide a new assembly and method for pouring liquid from a container which has many of the advantages of the liquid pourers mentioned heretofore and many novel features that result in a new assembly and method for pouring liquid from a container which is not anticipated, rendered obvious, suggested, or even implied by any of the prior art liquid pourers, either alone or in any combination thereof.

Still another object of the present invention is to provide a new assembly and method for pouring liquid from a container for ensuring that upon emptying the contents nothing will be left in the container.

Still yet another object of the present invention is to provide a new assembly and method for ensuring accurate premeasured amounts when pouring liquid from the container and to prevent short shooting of the liquid in subsequent dispensations from the container.

Even still another object of the present invention is to provide a new assembly and method for pouring liquid from a container that prevents waste and saves the user money by ensuring all of the contents will be emptied from the container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
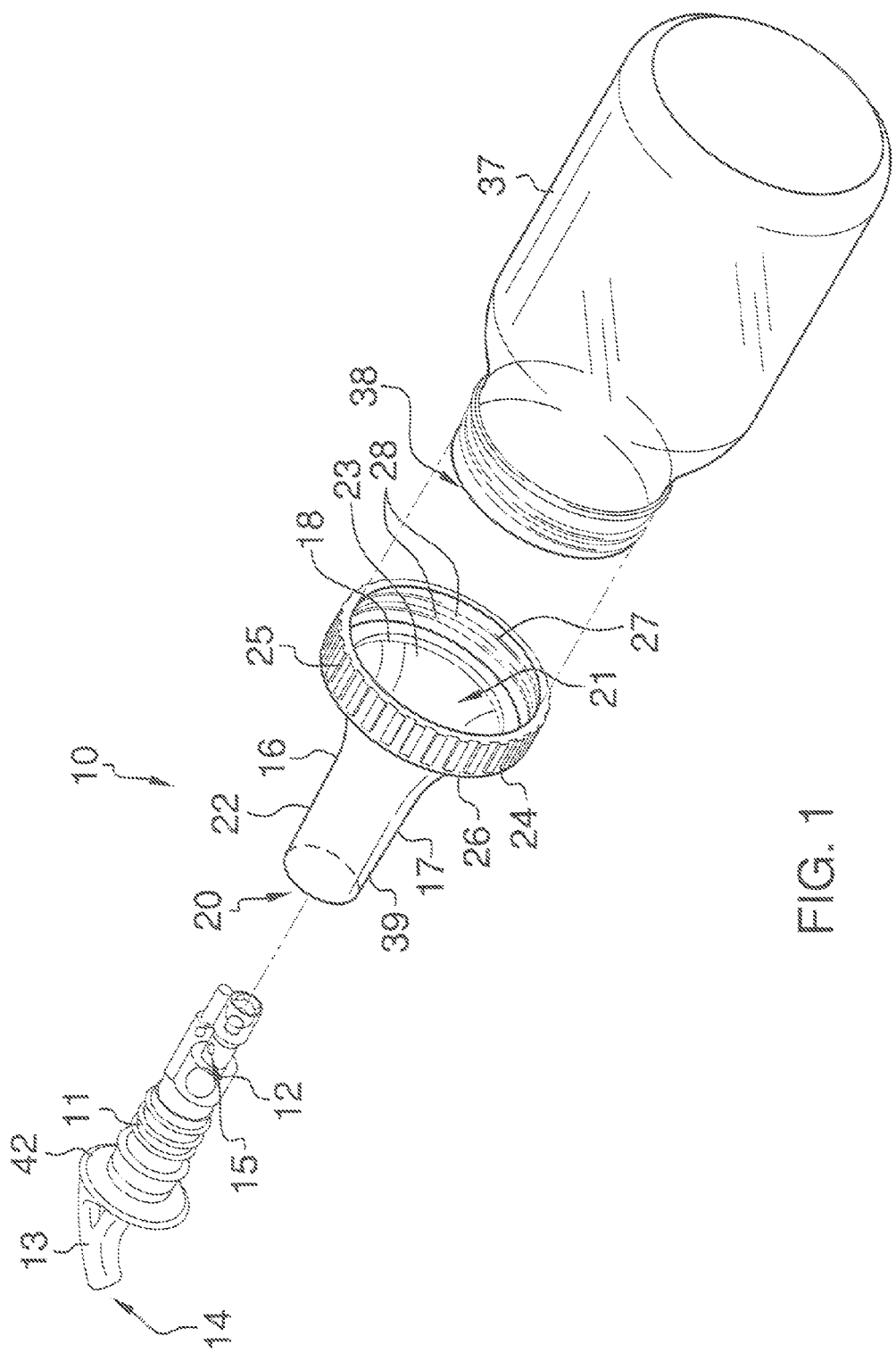
FIG. 1 is a bottom exploded perspective view of the container, the adapter with the threaded base for fastening to the jar, and the pourer according to the present invention.

With reference now to the drawings, and in particular to FIGS. 1 through 5 thereof, a new assembly and method for pouring liquid from a container embodying the principles and concepts of the present invention and generally designated by the reference numeral 10 will be described.

As best illustrated in FIGS. 1 through 5, the assembly and method for pouring liquid from a container 10 may generally comprise a pourer adapter 16 made of any suitable material and including a tube portion 17 having an open top 20, a bottom 18 and a bore 21 disposed therein through the open top 20 and the bottom 18, and also configured to fasten to a container 37 to facilitate dispensing liquid 43 from the container 37; and a pourer member 11 made of any suitable material and removably engaged to the pourer adapter 16 for pouring the liquid 43 from the container 37.

Figure 2:
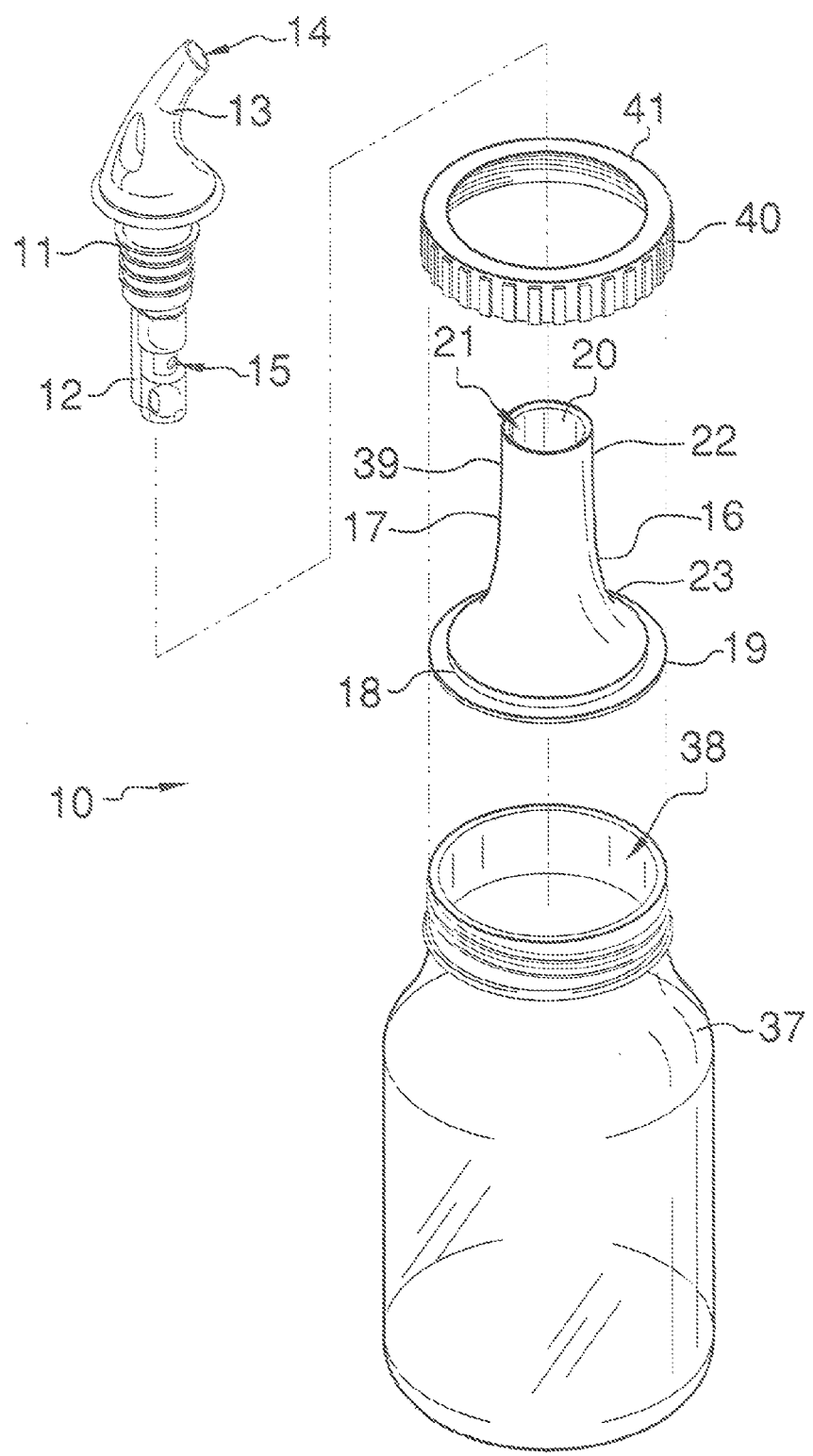
FIG. 2 is a top exploded perspective of the container, the ring cap ring that is used for the container, the cap ring adapter which doesn't have the threaded base, and the pourer.
Figure 3:
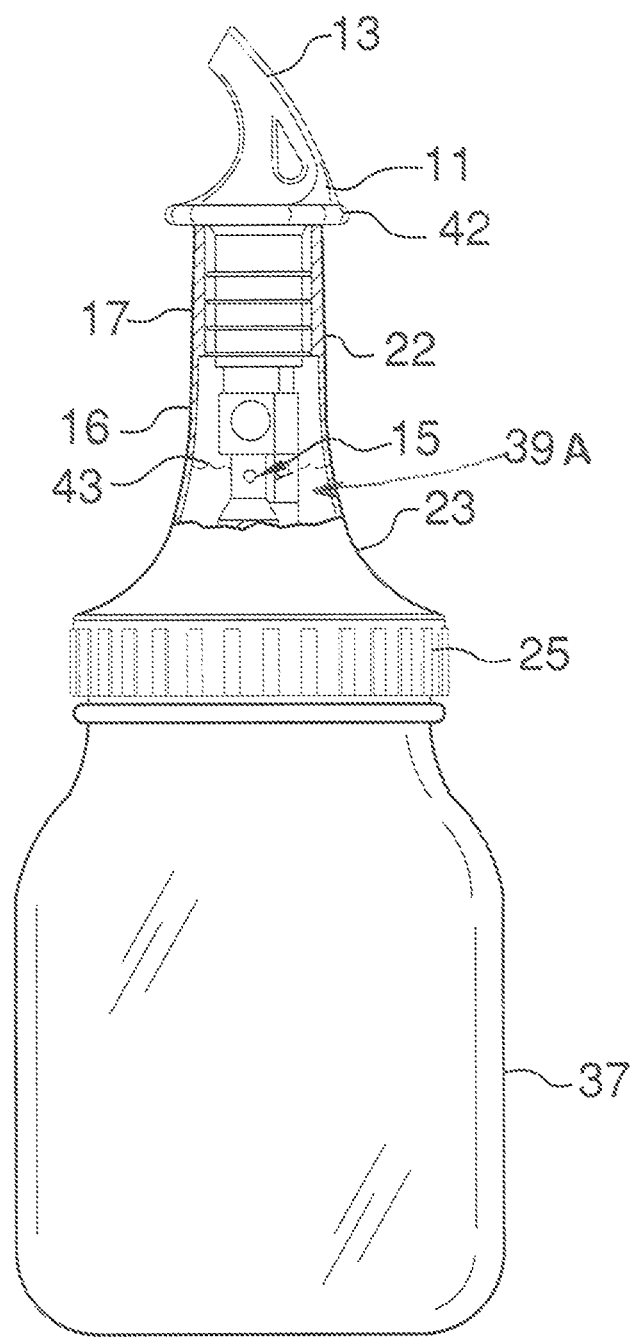
FIG 3. is side elevation view of the combined container pourer assembly with a cutaway portion near a top of the pourer adapter.

As shown in FIGS. 1 through 3, the pourer member 11 may have a pouring spout 13, a base portion 12, a collar 42 disposed intermediate of the spout 13 and base portion 12, and a bore 14 disposed through the spout 13 and the base portion 12 with an inlet port 15 disposed through a wall of the base portion 12 and in fluid communication with the bore 14. The base portion 12 may be removably and engagably received in the bore 21 of the pourer adapter 16 through the open top 20 thereof. The tube portion 17 and the bore 21 may be tapered inwardly from the bottom 18 to the open top 20 and forms a neck region 39 having a length and a bottom 39A disposed proximate to the bottom 18 of the tube portion 17. The tube portion 17 has an open bottom 18 which has an opening size two to three times larger than an opening size of the open top 20 to facilitate emptying of a container 37 especially a large mouth container such as a mason jar. As one embodiment, a ring member 40 with an annular flange 41 extending inwardly in an opening of the ring member 40 is engagable to a perimeter 19 of the bottom 18 of the tube portion 17 and adapted to fasten to the container 37 to secure the pourer adapter 16 upon an opening 38 into the container 37.

As a second embodiment as shown in FIG. 1, the pourer adapter 16 may also include a base 24 integral to the bottom 18 of the tube portion 17 and comprising a ring portion 25 adapted to fasten about a wide-mouth opening 38 of the container 37 and having a side wall 26 integrally depending from a perimeter 19 of the bottom 18 of the tube portion 17. The side wall 26 has threads 28 on an inner side 27 thereof to mate with threads about the opening 30 of the container 37.

As further shown in FIGS. 1 and 2, the bore 21 of the pourer adapter 16 may be tapered inwardly towards the inlet port 15 of the pourer member 11 upon the pourer member 11 being disposed in the bore 21 of the pourer adapter 16 with the inlet port 15 of the pourer member 11 disposed at the bottom 39A of the neck portion 39 and proximate to the bottom 18 of tube portion 17 to effect complete emptying of the liquid 43 from the container 37 and to provide accurate premeasured amounts of the liquid 43 dispensed each time the liquid 43 is poured from the container 37 with no short shoots. The bore 21 in the neck region 39 of the tube portion 17 has a size substantially equivalent to a size of the base portion 12 of the pourer member 11. All liquid 43 being dispensed through the pourer adapter 16 is funneled to the inlet port 15 to effect complete emptying of the container 37 and to effect accurate premeasured dispensing amounts. The pourer adapter 16 may have a funnel shape with the liquid 43 dispensed from the container 37 funneling to the inlet port 15 of the pourer member 11 to effect accurate premeasured amounts upon each dispensation of the liquid 43 from the container 37.

Figure 5:
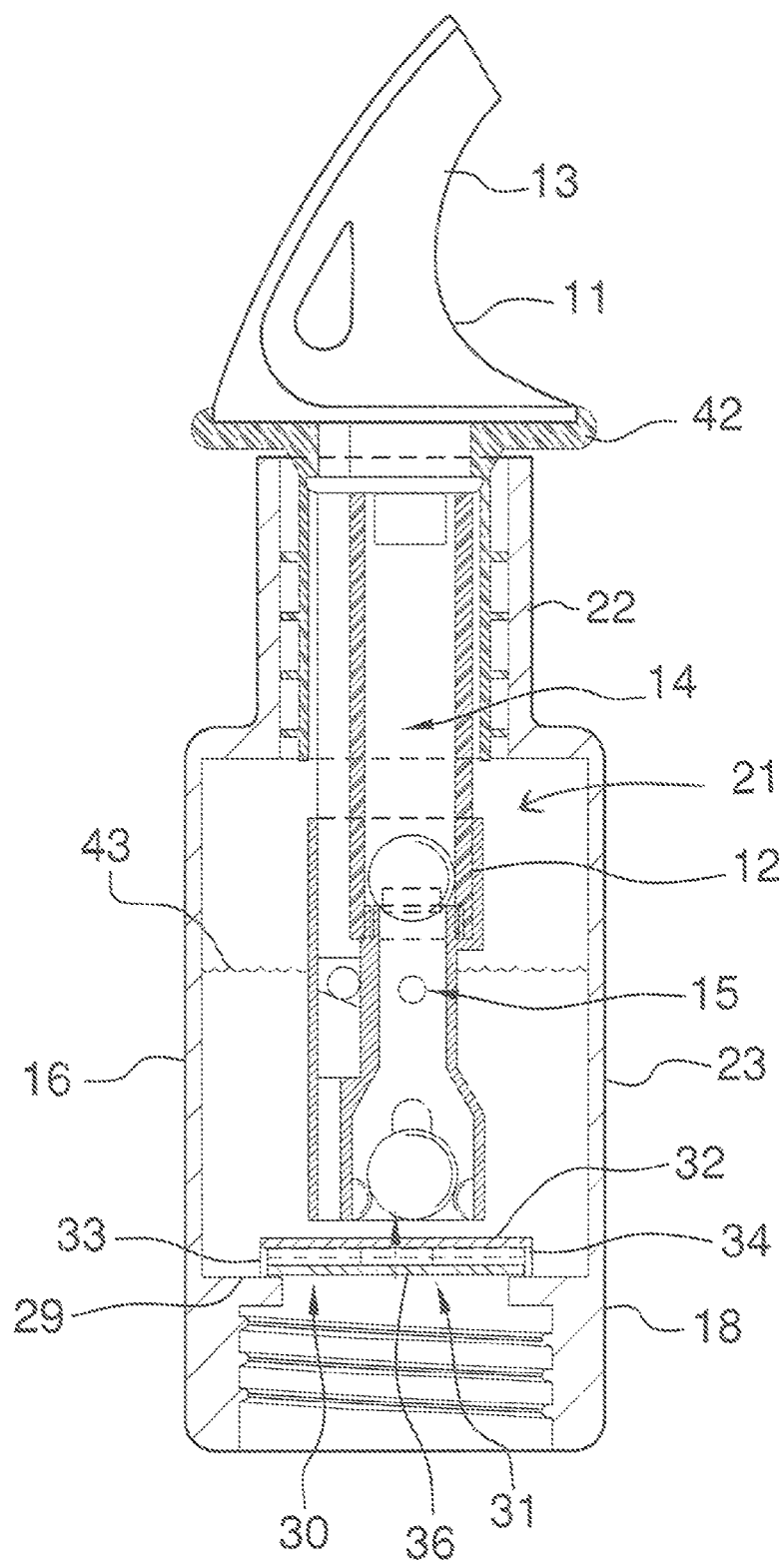
FIG. 5 is side elevation view of the combined container pourer assembly.

As another embodiment as shown in FIG. 5, the bore of the pourer adapter 16 may have stepped portions 22,23 including a bottom portion 23 and an upper portion 22 with the upper portions 22 being narrower than the bottom portion 23 and with the base portion 12 of the pourer member 11 removably engaged in the upper portion 22 of the bore 21 of the pourer adapter 16.

Figure 4:
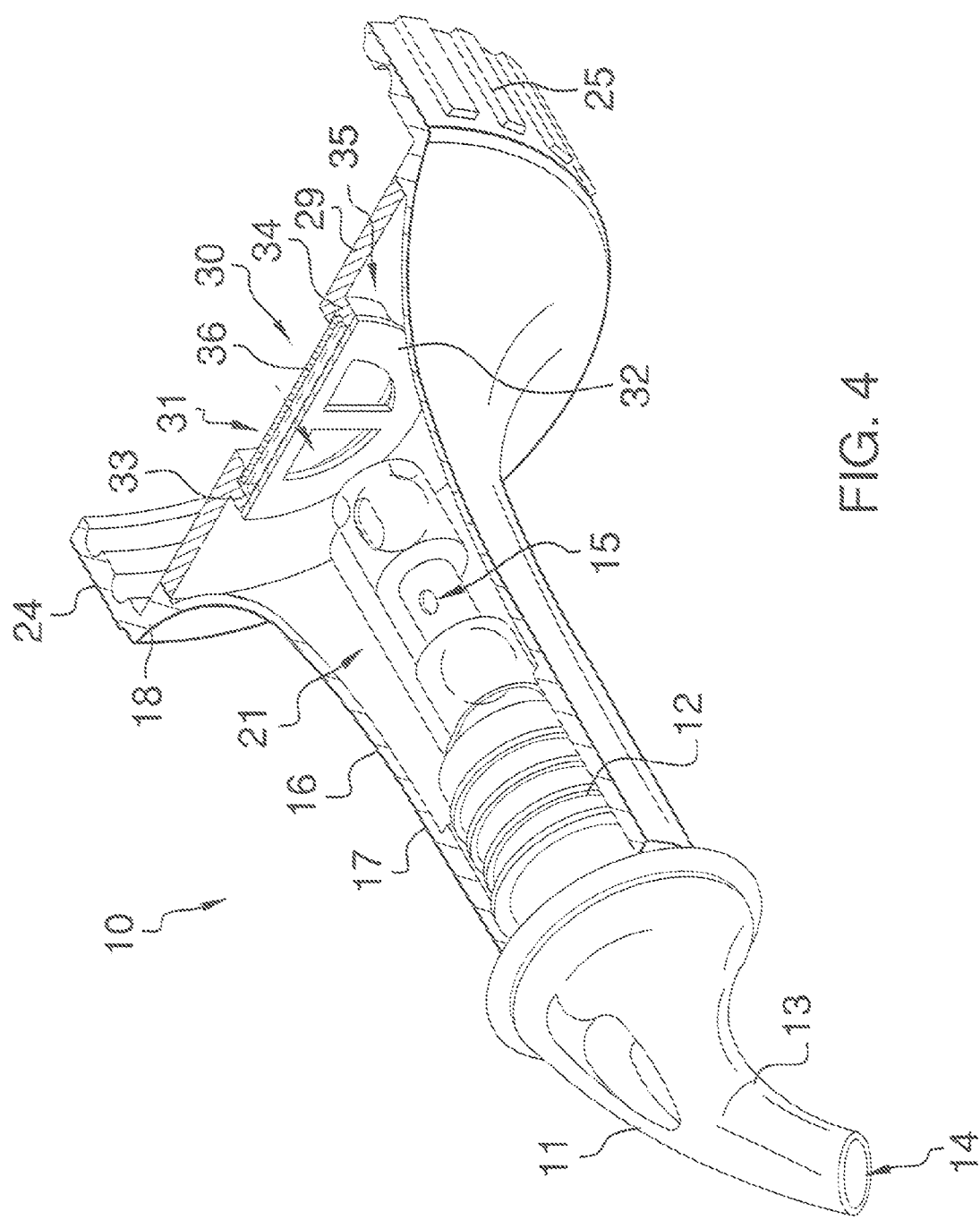
FIG 4. is a top exploded perspective of the container, the ring cap ring that is used for the container, the cap ring adapter which doesn't have the threaded base, and the pourer.

As illustrated in FIGS. 4 and 5, the pourer adapter 16 may also include a wall 29 transversely disposed in the bore 21 near the bottom 18 of the tube portion 17 and further includes an opening 30 disposed through the wall 29 into the bore 21 of the pourer adapter 16. The pourer adapter 16 may further include a valve mechanism 31 conventionally disposed in the opening 30 of the wall 29 to allow the liquid 43 dispensed from the container 37 into the bore 21 of the pourer adapter 16 and to prevent the liquid 43 in the bore 21 of the pourer adapter 16 from draining back into the container 37 when the container 37 is in a non-dispensing position and to keep the pourer member 11 primed with the inlet port 15 being submerged in the liquid 43 in the bore 21 of the pourer adapter 16 to prevent air from getting into the bore 21 of the pourer member 11 and obstructing the subsequent dispensing of the liquid 43 through the pourer member 11. The valve mechanism 31 may include a planar guide member 32 having perforations disposed therethrough and spaced upwardly from the wall 29 and the opening 30 and axially aligned with the opening 30 through the wall 29, and may also include support members 33,34 conventionally attached to the wall 29 and to the guide member 32 and spaced about the opening 30 with at least one opening 35 between the support members 33,34 to allow liquid to enter the bore 21 of the pourer adapter 16 from the container 37, and may further include a planar valve member 36 displaceably disposed in the opening 30 and upon an edge of the wall 29 forming the opening 30 for movable displacement between the opening 30 and the guide member 32. The valve mechanism 31 could also include other types of valves capable of functioning in a like manner.

In use, the pourer adapter 16 is securely and conventionally connected to the container 37 with liquid 43. The bottom 18 of the pourer adapter 16 is conventionally disposed over the opening 38 of the container 37. The pourer member 11 is then conventionally connected to and inserted into the pourer adapter 16. The base portion 12 of the pourer member 11 is inserted into the open top 20 of the pourer adapter 16 with the base portion 12 substantially occupying the bore 21 proximate to the open top 20. The liquid 43 from the container 37 is then dispensed through the pourer adapter 16 and the pourer member 11 as desired. All the liquid 43 from the container 37 is funneled to the inlet port 15 of the pourer member 11 through the pourer adapter 16 without any liquid 43 remaining in the container 37 upon emptying the container 37 to prevent short shooting the liquid being dispensed. A certain quantity of the liquid 43 is retained in the bore 21 of the pourer adapter 16 by the valve mechanism 31 when the container 37 is in a non-dispensing position to effect consistent premeasured subsequent liquid 43 dispensations. The inlet port 15 is submerged in the retained quantity of liquid 43 to prevent air from getting into the bore 14 of the pourer member 11 which otherwise would disrupt the subsequent premeasured pouring of the liquid 43 from the container 37. As the liquid 43 is being dispensed from the container 37, the liquid 43 presses on and displaces the valve member 36 and opens up the opening 38 through the wall 29 to allow the liquid 43 to flow into the bore 21 of the pourer adapter 16. The retained quantity of liquid 43 in the bore 21 of the pourer adapter 16 presses on and moves the valve member 36 to close the opening 30 through the wall 29 upon the container 37 being disposed in a non-dispensing position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the assembly and method for pouring liquid from a container. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An assembly for pouring liquid from a container comprising:
   a pourer adapter including a tube portion having an open top, a bottom and a bore disposed therein through the open top and the bottom, and also configured to fasten to a container to facilitate emptying of liquid from the container; and
   a pourer member removably engaged to the pourer adapter for pouring the liquid from the container, wherein the pourer member has a pouring spout, a base portion, a collar disposed intermediate of the pouring spout and the base portion, and a bore through the spout and the base portion with an inlet port in the base portion and in fluid communication with the bore: wherein the base portion is removably and engagably received in the bore of the pourer adapter through the open top thereof, wherein the tube portion and the bore are tapered inwardly from the bottom to the open top and forms a neck region having a length and a bottom disposed proximate to the bottom of the tube portion: wherein the tube portion has an open bottom which has an opening size two to three times larger than an opening size of the open top to facilitate emptying of a container, wherein the bore of the pourer adapter is tapered inwardly towards the inlet port of the pourer member upon the pourer member being disposed in the bore of the pourer adapter with the inlet port of the pourer member disposed at the bottom of the neck region and proximate to the bottom of tube portion to effect complete emptying of the liquid from the container and to provide accurate premeasured amounts of the liquid dispensed each time the liquid is poured from the container.

2. The assembly for pouring liquid from a container as described in claim 1, wherein the bore in the neck region of the tube portion has a size substantially equivalent to a size of the base portion of the pourer member; whereupon all liquid being dispensed through the pourer adapter is funneled to the inlet port to effect complete emptying of the container and to effect accurate measured dispensing amounts.

3. The assembly for pouring liquid from a container as described in claim 2, wherein the pourer adapter has a funnel shape with the liquid dispensed from the container funneling to the inlet port of the pourer member to effect accurate premeasured amounts upon each dispensation or the liquid from the container.

4. An assembly for pouring liquid from a container comprising:
   a pourer adapter including a tube portion having an open top, a bottom and a bore disposed therein through the open top and the bottom, and also configured to fasten to a container to facilitate emptying of liquid from the container; and
   a pourer member removably engaged to the pourer adapter for pouring the liquid from the container, wherein the pourer member has a pouring spout, a base portion, a collar disposed intermediate of the pouring spout and the base portion, and a bore through the spout and the base portion with an inlet port in the base portion and in fluid communication with the bore; wherein the base portion is removably and engagably received in the bore of the pourer adapter through the open top thereof, wherein the pourer adapter also includes a wall transversely disposed in the bore near the bottom of the tube portion and further includes an opening disposed through the wall into the bore of the pourer adapter, wherein the pourer adapter further includes a valve mechanism disposed in the opening of the wall to allow the liquid dispensed from the container into the bore and to prevent the liquid in the bore from draining back into the container when the container is in a non-dispensing position and to keep the pourer member primed with the inlet port being submerged in the liquid in the bore of the pourer adapter to prevent air from getting into the bore of the pourer member and obstructing the subsequent premeasured dispensing of the liquid through the pourer member.

5. The assembly for pouring liquid from a container as described in claim 4, wherein the valve mechanism includes a guide member spaced upwardly from the wall and axially aligned with the opening through the wall, and also includes support members attached to the wall and to the guide member and spaced about the opening in the wall with at least one opening between the support members, and further includes a planar valve member displaceably disposed over the opening in the wall.

6. A method for pouring liquid from a container comprising the steps of:
   providing a pourer adapter having a bottom and also providing a pourer member, wherein the pourer adapter also includes an opening in the bottom, and further includes a valve member for opening and closing the opening in the bottom;
   connecting the pourer adapter to a container with liquid;
   connecting the pourer member to the pourer adapter; and
   dispensing the liquid from the container through the pourer adapter and the pourer member.

7. The method for pouring liquid from a container as described in claim 6, wherein the dispensing the liquid includes retaining a quantity of the liquid in the pourer adapter with an inlet port of the pourer member being submerged in the liquid retained in the pourer adapter when the container is in a non-dispensing position to effect consistent premeasured subsequent liquid dispensations that don't short shoot the liquid being dispensed.

8. The method for pouring liquid from a container as described in claim 7, wherein the retaining a quantity of the liquid includes the liquid urging the valve member open upon being dispensed from the container into the pourer adapter.

9. The method for pouring liquid from a container as described in claim 8, wherein the retaining a quantity of the liquid includes the retained quantity of liquid urging the valve member closed upon the container being disposed in a non-dispensing position.

* * * * *